(12) United States Patent
Kubomura et al.

(10) Patent No.: US 7,036,972 B2
(45) Date of Patent: May 2, 2006

(54) LIGHTING UNIT FOR LIQUID CRYSTAL DISPLAY DEVICE

(75) Inventors: Kyoichi Kubomura, Kawasaki (JP); Masahiko Hayashi, Kawasaki (JP)

(73) Assignee: Zeon Corporation, Tokyo (JP)

( * ) Notice: Subject to any disclaimer, the term of this patent is extended or adjusted under 35 U.S.C. 154(b) by 84 days.

(21) Appl. No.: 10/433,617

(22) PCT Filed: Dec. 18, 2001

(86) PCT No.: PCT/JP01/11102

§ 371 (c)(1),
(2), (4) Date: Jun. 17, 2003

(87) PCT Pub. No.: WO02/50607

PCT Pub. Date: Jun. 27, 2002

(65) Prior Publication Data

US 2004/0027512 A1    Feb. 12, 2004

(30) Foreign Application Priority Data

Dec. 18, 2000  (JP) ............................. 2000-383444

(51) Int. Cl.
*F21V 7/04* (2006.01)

(52) U.S. Cl. ...................... 362/619; 362/224; 362/617; 349/65

(58) Field of Classification Search ................ 362/26, 362/27, 30, 31, 224, 231, 260, 615, 617, 362/619, 614; 349/61, 62, 65
See application file for complete search history.

(56) References Cited

U.S. PATENT DOCUMENTS 3,748,518 A     7/1973  Lewis ......................... 313/109
5,396,406 A *   3/1995  Ketchpel ....................... 362/27

FOREIGN PATENT DOCUMENTS

| | | |
|---|---|---|
| JP | 49-56477 | 5/1974 |
| JP | 51-59989 | 5/1976 |
| JP | 63-043910 | 2/1988 |
| JP | 64-001706 | 1/1989 |
| JP | 64-066216 | 3/1989 |
| JP | 03-014882 | 1/1991 |
| JP | 03-020956 | 1/1991 |
| JP | 03-122137 | 5/1991 |
| JP | 03-110418 | 11/1991 |
| JP | 03-280079 | 12/1991 |
| JP | 04-129164 | 4/1992 |

(Continued)

*Primary Examiner*—John Anthony Ward
(74) *Attorney, Agent, or Firm*—Armstrong, Kratz, Quintos, Hanson & Brooks, LLP (57) ABSTRACT

The invention provides an illumination unit for liquid crystal display systems, which comprises an illumination light source for emitting visible light rays and a light guide plate or a light diffusion plate having an entrance surface and an exit surface. The illumination light source is located such that light rays therefrom are entered into the light guide plate or light diffusion plate from the entrance surface. The light guide plate or light diffusion plate is formed of a transparent synthetic resin. The maximum intensity of light in an ultraviolet range having a wavelength of 350 nm or less as measured all over the entrance surface of the light guide plate or light diffusion plate is 2 $\mu W/(cm^2 \cdot nm)$ or less. The illumination light source has a maximum emission intensity of 2 $\mu W/(cm^2 \cdot nm)$ or less in an ultraviolet range having a wavelength of 350 nm or less.

20 Claims, 1 Drawing Sheet

FOREIGN PATENT DOCUMENTS

| | | |
|---|---|---|
| JP | 06-136057 | 5/1994 |
| JP | 07-258318 | 10/1995 |
| JP | 08-264157 | 10/1996 |
| JP | 09-167860 | 6/1997 |
| JP | 11-007010 | 1/1999 |
| JP | 2000-251839 | 9/2000 |

* cited by examiner

LIGHTING UNIT FOR LIQUID CRYSTAL DISPLAY DEVICE

TECHNICAL FIELD

The present invention relates to an illumination unit that is suitably used in the form of a back light or front light for liquid crystal display systems.

BACKGROUND ART

A liquid crystal display system comprises a liquid crystal display (LAD) and a back light or front light for illuminating the same. A transmission type LAD provided with a back light is set up such that light rays from the illumination unit are directed to the back surface of the LAD. Upon the light rays passing through the LAD, a light-and-dark pattern is created depending on changes in the light transmittance of the LAD, showing information in the form of textural or pictorial information.

The back light is generally broken down into the sidelight type (also called the edge type) and the underlying type depending on where the light source is located with respect to the display screen.

The sidelight type illumination unit generally comprises a linear light source such as a cold cathode fluorescent discharge tube and a light guide plate. This illumination unit is designed such that light rays leaving the linear light source are entered into the light guide plate from at least one side surface thereof (i.e., the entrance side surface), and then reflected at the back surface (i.e., the reflecting surface) of light reflectivity, leaving the front surface (i.e., the exit surface) of the unit.

Comprising a light source and a light diffusion plate, the underlying type illumination unit is designed such that light rays leaving the light source are entered into the light diffusion plate from the back (entrance) surface thereof, and then irregularly reflected by a light diffusion substance dispersed therein, leaving the front (exit) surface of the unit.

In recent years, light guide plates and light diffusion plates formed of lightweight, transparent resins having improved moldability (formidability) have been used. Mostly in the illumination unit for liquid crystal display systems, on the other hand, a fluorescent discharge tube (that is, a fluorescent lamp such as a hot or cold cathode fluorescent discharge tube) is used as a light source. The fluorescent discharge tube gives out ultraviolet rays together with visible light rays; as the light guide plate or light diffusion plate formed of a transparent resin is used over an extended period of time, they are susceptible to coloration due to the degradation of the transparent resin by ultraviolet rays. Consequently, while the liquid crystal display system is used over an extended period of time, the light leaving the illumination unit is colored (with a chromaticity increase), causing the quality of displays to become worse.

For an illumination unit having a light guide plate or a light diffusion plate, each formed of an acrylic resin, an approach has been proposed, wherein ultraviolet rays are cut out of light rays leaving a light source by varying the composition, etc. Of a glass tube that forms a fluorescent discharge tube. However, the ultraviolet rays that can be cut off by this approach are limited to those in a relatively short wavelength range (near 250-nm wavelength). For this reason, the approach is somewhat effective for acrylic resins having relatively higher resistance to degradation by ultraviolet rays among transparent resins; however, it is considerably less effective for other useful transparent resins. This still renders it difficult to develop and practically use an illumination unit for liquid crystal display systems, in which various transparent resins excellent in transparency and heat resistance are used for the light guide plate and light diffusion plate.

DISCLOSURE OF THE INVENTION

One object of the present invention is to provide an illumination unit for liquid crystal display systems, which comprises a light guide plate or a light diffusion plate formed of a transparent resin, and which, even upon used over an extended period of time, is less susceptible to coloration of emergent light.

Another object of the present invention is to provide an illumination unit for liquid crystal display systems, which is of high luminance and improved heat resistance, and which, even upon used over an extended period of time, is less susceptible to coloration of emergent light.

As a result of intensive studies made so as to attain these objects, the present inventors have found that by considerably reducing the quantity of ultraviolet rays including not only extreme ultraviolet and far-ultraviolet rays having wavelengths of 300 nm or less but also near-ultraviolet rays in the wavelength range of 300 to 350 nm from light rays that pass through a light guide plate or a light diffusion plate used with a liquid crystal display system, it is possible to obtain an illumination unit for liquid crystal display systems, which, even upon used over an extended period of time, is less susceptible to coloration of emergent light.

The inventors have also found that by using a resin improved in transparency, heat resistance, etc., for instance, an alicyclic structure-containing resin as the transparent resin, it is possible to obtain an illumination unit for liquid crystal display systems, which is of high luminance and improved heat resistance, and which, even upon used over an extended period of time, is less susceptible to coloration of emergent light.

These findings underlie the present invention.

Thus, the present invention provides an illumination unit for liquid crystal display systems, which comprises (A) an illumination light source for emitting visible light rays and (B) a light guide plate or a light diffusion plate having an entrance surface and an exit surface, said illumination light source being located such that light rays therefrom are entered into said light guide plate or light diffusion plate from said entrance surface, wherein:

said light guide plate or said light diffusion plate is formed of a transparent synthetic resin, and the maximum intensity of light in an ultraviolet range having a wavelength of 350 nm or less as measured all over said entrance surface of said light guide plate or said light diffusion plate is 2 $\mu W/(cm^2 \cdot nm)$ or less.

The present invention also provides an illumination unit for liquid crystal display systems, which comprises (A) an illumination light source for emitting visible light rays and (B) a light guide plate or a light diffusion plate having an entrance surface and an exit surface, said illumination light source being located such that light rays therefrom are entered into said light guide plate or light diffusion plate from said entrance surface, wherein:

said light source has a maximum emission intensity of 2 $\mu W/(cm^2 \cdot nm)$ or less in an ultraviolet range having a wavelength of 350 nm or less, and said light guide plate or said light diffusion plate is formed of a transparent synthetic resin.

BEST MODE OF CARRYING OUT THE INVENTION

The illumination unit for liquid crystal display systems according to the present invention comprises (A) an illumination light source for emitting visible light rays and (B) a light guide plate or a light diffusion plate having an entrance surface and an exit surface. In this illumination unit for liquid crystal display systems, the illumination light source and the light guide plate or light diffusion plate are located such that light rays leaving the illumination light source are entered into the light guide plate or light diffusion plate from the entrance surface thereof. The light rays entered into the light guide plate or light diffusion plate leave the exit surface thereof, illuminating the liquid crystal display (LAD) of the liquid crystal display system.

In the present invention, the maximum intensity of light in the ultraviolet range having a wavelength of 350 nm or less, as measured all over the entrance surface of the light guide plate or light diffusion plate, is reduced down to 2 $\mu W/(cm^2 \cdot nm)$ or less or a light source having a maximum emission intensity of 2 $\mu W/(cm^2 \cdot nm)$ or less in the ultraviolet range having a wavelength of 350 nm or less is used, thereby considerably reducing the coloration of the light guide plate or light diffusion plate formed of the transparent resin due to degradation by ultraviolet rays.

Thus, the illumination unit of the present invention does not suffer coloration and luminance drops of emergent light, even upon used over an extended period of time while the light source is held on. In the illumination unit of the present invention, the light source having a maximum emission intensity of 2 $\mu W/(cm^2 \cdot nm)$ or less in the ultraviolet range having a wavelength of 350 nm or less is used and the maximum intensity of light in the ultraviolet range having a wavelength of 350 nm or less, as measured all over the entrance surface of the light guide plate or light diffusion plate, is reduced down to 2 $\mu W/(cm^2 \cdot nm)$ or less, thereby considerably reducing the coloration of the light guide plate or light diffusion plate formed of the synthetic resin due to degradation by ultraviolet rays.

(1) Illumination Light Source

Nothing but to give out visible light rays is imposed on the light source used for the illumination unit of the present invention; for instance, use may be made of incandescence electric bulbs, fluorescent discharge tubes, light-emitting diode devices (LEDs) and electro-luminescent devices (EL devices), among which the fluorescent tubes and LEDs are preferred in consideration of luminance, color temperature, low heat generation capability, low ultraviolet emission capability, etc. Of the fluorescent discharge tubes, a cold cathode fluorescent discharge tube is more preferred.

A hot cathode fluorescent discharge tube, because of being capable of selecting any desired wavelength, is suitable for color displays; however, it is slightly shorter in service life than the cold cathode fluorescent discharge tube, and generates heat as well. The LED has a long service life with no generation of heat, but it is limited to monochromatic displays. The EL has a short service life. The cold cathode fluorescent discharge tube, by contrast, has a luminance peak in the visible range and a long service life, and so is suitable for color displays.

Of the illumination light sources, accordingly, the cold cathode fluorescent discharge tube is most preferred; however, this has a demerit of emitting ultraviolet rays in addition to visible light rays. That is, in the fluorescent discharge tube, ultraviolet rays occurring therein are absorbed in a fluorescent substance to excite it, giving out visible light rays together with some ultraviolet rays. Those ultraviolet rays have strong absorption at specific wavelengths (of 254 nm and 313 nm).

In the present invention, it is preferable to use a fluorescent discharge tube in which ultraviolet rays in the wavelength range inclusive of 254-nm and 313-nm wavelengths are reduced from light rays leaving the light source. More specifically in the present invention, it is desired to use a light source in which the maximum emission intensity in the ultraviolet range of 350 nm or less is 2 $\mu W/(cm^2 \cdot nm)$ or less, preferably 1 $\mu W/(cm^2 \cdot nm)$ or less, and more preferably 0.5 $\mu W/(cm^2 \cdot nm)$ or less.

Among the illumination light sources that satisfy the aforesaid requirement, for instance, there is a cold cathode fluorescent discharge tube comprising a tube formed of a material having a maximum light transmittance of 85% or less in an ultraviolet range having a wavelength of 200 to 350 nm, as measured at a thickness of 1 mm. The maximum light transmittance should be preferably 75% or less, and more preferably 60% or less.

For the above material, it is preferable to use a glass that selectively absorbs light rays in the wavelength range of 200 to 350 nm and is excellent in the transmission of light rays in the visible light range. Such glass, for instance, includes borosilicate glass (composed mainly of $Na_2O \cdot B_2O_3 \cdot SiO_2$) which contains mainly silica sand, silica rock and feldspars as ores containing much silicon dioxide ($SiO_2$) and in which a substance that absorbs light rays having a wavelength of 350 nm or less is incorporated.

The substance that absorbs light rays having a wavelength of 350 nm or less, for instance, includes metal oxides (hereinafter referred to as the ultraviolet-absorbing metal oxides) such as titanium oxide ($TiO_2$), cerium oxides ($Ce_2O_3$, $CeO_2$), zinc oxide (ZnO), tantalum oxide ($Ta_2O_6$), zirconium oxide ($ZrO_2$) and silicon oxide (SiO). These ultraviolet-absorbing metal oxides may be used alone or in combination of two or more. In the metal oxides as exemplified above, only the metals may be present in stabilized metal ion forms.

Examples of the borosilicate glass are commercially available in the trade names of BFW glass, BFK glass, etc. from Nippon Electric Glass Co., Ltd.

In the present invention, it is preferable to make use of a light source having a metal oxide layer because ultraviolet rays (near-ultraviolet rays) on a long-wavelength side of 300 to 350 nm, especially the 313-nm wavelength ultraviolet ray can be much more reduced. For such a light source having a metal oxide layer, for instance, it is preferable to use a cold cathode fluorescent discharge tube that is provided on the front and/or back surfaces thereof with a metal oxide layer(s). For the metal oxide, the same as mentioned for the aforesaid ultraviolet-absorbing metal oxide that absorbs light rays having a wavelength of 350 nm or less may be used. Among others, titanium oxide ($TiO_2$) and silicon oxide (SiO) are particularly preferred in consideration of close contact with a glass tube, linear expansion coefficient, etc. It is generally noted that the metal oxide layer may be formed not only by coating but also by dry processes such as evaporation. The metal oxide layer may be provided in a single layer form or in an about 2 to 6-layered form.

The metal oxide layer has a thickness of usually about 0.05 to 1 μm, and mostly about 0.1 to 0.5 μm.

(2) Light Guide Plate

The light guide plate used herein is a plate formed of the transparent resin by molding, and comprises an entrance surface for receiving light rays from the illumination light source, a reflecting surface for reflecting the incident light and an exit surface via which light leaves the light guide plate, at least one per each. The light guide plate may be configured not only in a flat plate form but also in such a wedge form as to become thin farther off the light source in view of reflectivity, weight reductions, etc. The light guide plate may be provided on the entrance surface with a metal oxide layer that absorbs light rays having a wavelength of 350 nm or less.

(3) Light Diffusion Plate

The light diffusion plate used herein is a plate formed of the transparent resin by molding, and comprises an entrance surface and an exit surface, at least one per each. A light-reflecting substance and/or an air layer (bubbles) having a function of scattering light are dispersed in the light diffusion plate, so that the light entered from the entrance surface is guided to the exit surface while it is irregularly reflected.

The light-reflecting substance, for instance, includes organic fine particles and inorganic fine particles. To be specific, organic fine particles such as polystyrene particles and silicone particles and inorganic fine particles of inorganic substances such as silica, alumina and titania are preferred. As is the case with the light guide plate, the light-scattering plate may be provided on the entrance surface with a metal oxide layer that absorbs light rays having a wavelength of 350 nm or less.

(4) Transparent Resin

No specific limitation is imposed on the transparent resin used herein provided that it can transmit light. For instance, alicyclic structure-containing polymer resins such as norbornene polymers and vinyl alicyclic hydrocarbon polymers; acrylic resins such as polymethyl methacrylate (PMMA); polyester resins such as polycarbonate (PC), polyethylene terephthalate (PET) and polybutylene terephthalate (PBT); polyolefin resins such as polystyrene and polymethylpentene (TPX); and acrylonitrilestyrene resins are used. Among these transparent resins, preference is given to the alicyclic structure-containing polymer resins, acrylic resins and polycarbonate resin because of improved transparency and heat resistance, although the alicyclic structure-containing polymer resins are most preferred. Especially when the light guide plate or light diffusion plate fabricated using the alicyclic structure-containing polymer resin is used, the resulting illumination unit is improved in terms of emission luminance and heat resistance. When this unit is used in combination with the aforesaid light source, the occurrence of coloration as well as luminance drops of the unit when used over an extended period of time can be reduced.

(5) Alicyclic Structure-Containing Polymer Resin

The alicyclic structure-containing polymer resin is a polymer having an alicyclic structure in its repeating unit. The alicyclic structure may be contained in the main chain and/or the side chain; however, a polymer having an alicyclic structure in the main chain is preferred in view of transparency. The alicyclic structure, for instance, includes a cycloalkane structure and a cycloalkene structure, although the cycloalkane structure is preferred in view of transparency. Specifically but not exclusively, improved transparency is obtained with an alicyclic structure having usually 4 to 30, preferably 5 to 20, and more preferably 5 to 15 carbon atoms.

The proportion in the alicyclic structure-containing polymer of the repeating unit having an alicyclic structure is usually 50% by weight or greater, preferably 70% by weight or greater, and more preferably 90% by weight or greater, although it may be selected depending on the intended purpose. Too low a proportion in the alicyclic structure-containing polymer of the repeating unit having an alicyclic structure is not preferable because transparency becomes worse. No particular limitation is imposed on the balance of the alicyclic structure-containing polymer except the alicyclic structure-containing repeating unit; it may appropriately be selected on the intended purpose.

The polymer resin having an alicyclic structure, for instance, includes (i) norbornene polymers, (ii) monocyclic olefin polymers, (iii) cyclic conjugated diene polymers and (iv) vinyl alicyclic hydrocarbon polymers as well as hydrogenated products thereof, among which the hydrogenated norbornene polymers as well as the vinyl alicyclic hydrocarbon monomers and their hydrogenated products are preferred in view of transparency, although the hydrogenated norbornene polymers are more preferred.

(i) Norbornene Polymers

The norbornene polymers used herein, for instance, are known from JP-A's 3-14882 and 3-122137, specifically including ring-opening polymers of norbornene monomers and their hydrogenated product, addition polymers of norbornene monomers and addition type copolymers of norbornene monomers and other monomers copolymerizable therewith, among which hydrogenated products of the ring-opening polymers of norbornene monomers are most preferred in view of transparency.

The norbornene monomers used herein, for instance, include bicyclo[2.2.1]-hept-2-ene (known under the common name of norbornene), 5-methyl-bicyclo[2.2.1]-hept-2-ene, 5,5-dimethyl-bicyclo[2.2.1]-hept-2-ene, 5-ethyl-bicyclo[2.2.1]-hept-2-ene, 5-butyl-bicyclo[2.2.1]-hept-2-ene, 5-hexyl-bicyclo[2.2.1]-hept-2-ene, 5-ocyl-bicyclo[2.2.1]-hept-2-ene, 5-octadecyl-bicyclo[2.2.1]-hept-2-ene, 5-ethylidene-bicyclo[2.2.1]-hept-2-ene, 5-methylidene-bicyclo[2.2.1]-hept-2-ene, 5-vinyl-bicyclo[2.2.1]-hept-2-ene, 5-propenyl-bicyclo[2.2.1]-hept-2-ene, 5-methoxy-carbonyl-bicyclo[2.2.1]-hept-2-ene, 5-cyano-bicyclo[2.2.1]-hept-2-ene, 5-methyl-5-methoxycarbonyl-bicyclo[2.2.1]-hept-2-ene, 5-methoxycarbonyl-bicyclo[2.2.1]-hept-2-ene, 5-ethoxycarbonyl-bicyclo[2.2.1]-hept-2-ene, 5-metyl-5-ethoxycarbonyl-bicyclo[2.2.1]-hept-2-ene, bicyclo[2.2.1]-hept-5-enyl-2-methylpropionate, bicyclo[2.2.1]-hept-5-enyl-2-methyloctanate, bicyclo[2.2.1]-hept-2-ene-5,6-dicarboxylic acid anhydride, 5-hydroxymethyl-bicyclo[2.2.1]-hept-2-ene, 5,6-di(hydroxymethyl)-bicyclo[2.2.1]-hept-2-ene, 5-hydroxy-i-propyl-bicyclo[2.2.1]-hept-2-ene, bicyclo[2.2.1]-hept-2-ene, 5,6-dicarboxy-bicyclo[2.2.1]-hept-2-ene, bicyclo[2.2.1]-hept-2-ene-5,6-dicarboxylic imide, 5-cyclopentyl-bicyclo-[2.2.1]-hept-2-ene, 5-cyclohexyl-bicyclo[2.2.1]-hept-2-ene, 5-cyclohexenyl-bicyclo[2.2.1]-hept-2-ene, 5-phenyl-bicyclo[2.2.1]-hept-2-ene, tricyclo[4.3.1$^{2,5}$.0$^{1,6}$]-deca-3,7-diene (known under the common name of dicyclopentadiene), tricyclo[4.3.1$^{2,5}$.0$^{1,6}$]-deca-3-ene, tricyclo[4.4.1$^{2,5}$.0$^{1,6}$]-undeca-3,7-diene, tricyclo[4.4.1$^{2,5}$.0$^{1,6}$]-undeca-3,8-diene, tricyclo[4.4.1$^{2,5}$.0$^{1,6}$]-undeca-3-ene, tetracyclo[7.4.1$^{10,13}$.0$^{1,9}$.0$^{2,7}$]-trideca-2,4,6-11- tetraene (also referred to as 1,4-methano-1,4,4a,9a-tetrahydroflorene), tetracyclo[8.4.1$^{11,14}$.0$^{1,10}$.0$^{3,8}$]-tetradeca-3,5,7,12-11-tetraene (also referred to as 1,4-methano-1,4,4a,5.10.10a-hexahydroanthracene), tetracyclo [4.4.1$^{2,5}$.1$^{7,10}$.0]-dodeca-3-ene (also referred to as tetracyclododecene), 8-methyl-tetracyclo[4.4.1$^{2,5}$.1$^{7,10}$.0]-dodeca-3-ene, 8-methyl-tetracyclo[4.4.1$^{2,5}$.1$^{7,10}$.0]-dodeca-3-ene, 8-ethyl-tetracyclo[4.4.1$^{2,5}$.1$^{7,10}$.0]-dodeca-3-ene, 8-methylidene-tetracyclo[4.4.1$^{2,5}$.1$^{7,10}$.0]-dodeca-3-ene, 8-ethylidene-tetracyclo[4.4.1$^{2,5}$.1$^{7,10}$.0]-dodeca-3-ene, 8-vinyl-tetracyclo[4.4.1$^{2,5}$.1$^{7,10}$.0]-dodeca-3-ene, 8-propenyl-tetracyclo[4.4.1$^{2,5}$.1$^{7,10}$.0]-dodeca-3-ene, 8-methoxycarbonyl-tetracyclo[4.4.1$^{2,5}$.1$^{7,10}$.0]-dodeca-3-ene, 8-methyl-8-methoxycarbonyl-tetracyclo[4.4.1$^{2,5}$.1$^{7,10}$.0]-dodeca-3-ene, 8-hydroxymethyl-tetracyclo[4.4.1$^{2,5}$.1$^{7,10}$.0]-dodeca-3-ene, 8-carboxy-tetracyclo[4.4.1$^{2,5}$.1$^{7,10}$.0]-dodeca-3-ene, 8-cyclopentyl-tetracyclo[4.4.1$^{2,5}$.1$^{7,10}$.0]-dodeca-3-ene, 8-cyclohexyl-tetracyclo[4.4.1$^{2,5}$.1$^{7,10}$.0]-dodeca-3-ene, 8-cyclohexenyl-tetracyclo[4.4.1$^{2,5}$.1$^{7,10}$.0]-dodeca-3-ene, 8-phenyl-tetracyclo[4.4.1$^{2,5}$.1$^{7,10}$.0]-dodeca-3-ene, pentacyclo[6.5.1$^{1,}$$_{8}$.1$^{3,6}$.0$^{2,7}$.0$^{9,13}$]-pentadeca-3,10-diene, and pentacyclo [7.4.1$^{3,6}$.1$^{10,13}$.0$^{1,9}$.0$^{2,7}$]-pentadeca-4,11-diene. These norbornene monomers may be used alone or in combination of two or more.

The ring-opening polymers of norbornene monomers may be obtained by the ring-opening polymerization of norbornene monomers in the presence of ring-opening polymerization catalysts. The ring-opening polymerization catalysts, for instance, include catalyst systems comprising halides, nitrates or acetylacetone compounds of metals such as ruthenium, rhodium, palladium, osmium, iridium and platinum and reducing agents, and catalyst systems comprising halides or acetylacetone compounds of metals such as titanium, vanadium, zirconium, tungsten and molybdenum and organoaluminum compounds. The polymerization reaction may be carried out in the presence or absence of a solvent and usually at a polymerization temperature of −50° C. to 100° C. and a polymerization pressure of 0 to 50 kg/cm$^2$.

The hydrogenated products of the ring-opening polymers of norbornene monomers may be obtained by adding a hydrogenation catalyst to a polymerization solution of the ring-opening polymer of a norbornene monomer for hydrogenation of a carbon-carbon double bond by hydrogen. Specifically but not exclusively, heterogeneous or homogeneous catalyst systems may be used as the hydrogenation catalyst.

The addition (co)polymers of norbornene monomers and other monomers copolymerizable therewith, for instance, may be obtained by the (co)polymerization in the presence or absence of a solvent of the monomer components in the presence of a catalyst system comprising a titanium, zirconium or vanadium compound and an organoaluminum compound and usually at a polymerization temperature of −50° C. to 100° C. and a polymerization pressure of 0 to 50 kg/cm$^2$.

The copolymerizable monomers, for instance, include α-olefins having 2 to 20 carbon atoms such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene; cycloolefins such as cyclobutene, cyclopentene, cyclohexene, 3,4-dimethylcyclopentene, 3-methylcyclohexene, 2-(2-methylbutyl)-1-cyclohexene, cyclooctene and 3a,5,6,7a-tetrahydro-4,7-methano-1H-indene; and nonconjugated dienes such as 1,4-hexadiene, 4-methyl-1,4-hexadiene, 5-methyl-1,4-hexadiene and 1,7-octadiene, among which α-olefins are preferred although ethylene is most preferred.

The other monomers copolymerizable with the norbornene monomer may be used alone or in combination of two or more. For the addition copolymerization of the norbornene monomer and other monomer copolymerizable therewith, the proportion in the addition copolymer of the bond unit derived from the norbornene monomer and the bond unit derived from the other monomer copolymerizable therewith is selected from the range of, by weight, usually 30:70 to 99:1, preferably 50:50 to 97:3, and more preferably 70:30 to 95:5.

(ii) Monocyclic Olefin Polymers

For the monocyclic olefin polymers, for instance, addition polymers of monocyclic olefin monomers such as cyclohexene, cycloheptene and cyclooctene as set forth in JP-A 64-66216 may be used.

(iii) Cyclic Conjugated Diene Polymers

For the cyclic conjugated diene polymers, for example, 1,2- or 1,4-addition polymers of such cyclic conjugated diene monomers as set forth in JP-A's 6-136057 and 7-258318, e.g., cyclopentadiene and cyclohexadiene as well as their hydrogenated products may be used.

(iv) Vinyl Alicyclic Hydrocarbon Polymers

For the vinyl alicyclic hydrocabon polymers, for instance, use may be made of polymers of such vinyl alicyclic hydrocarbon monomers as set forth in JP-A 51-59989, e.g., vinylcyclohexene and vinylcyclohexane as well as their hydrogenated products, and polymers of such vinyl aromatic monomers as set forth in JP-A's 63-43910 and 64-1706, e.g., styrene and α-methylstyrene, in which the aromatic ring moieties are hydrogenated. Use may also be made of random, block and other copolymers of the vinyl alicyclic hydrocarbon monomers or vinyl aromatic monomers their hydrogenated products. Specifically but not exclusively, diblock, triblock or multiblock copolymers or gradient block copolymers may be used as the block copolymers.

While the molecular weight of the alicyclic structure-containing polymer resin used herein may appropriately be determined depending on the intended purpose, its weight-average molecular weight should be in the range of usually 5,000 to 500,000, preferably 8,000 to 200,000, and more preferably 10,000 to 100,000 as measured and calculated on a polyisoprene or polystyrene basis by means of gel permeation chromatography (GPC) using a cyclohexane solution (or a toluene solution when the polymer is not dissolved in cyclohexane), because the mechanical strength of the resultant molding is balanced against moldability (formidability) on high levels.

While the glass transition temperature (Tg) of the alicyclic structure-containing polymer resin used herein may appropriately be determined depending on the intended purpose, it should be in the range of usually at least 80° C., preferably 100° C. to 250° C., and more preferably 120° C. to 200° C. In this range for Tg, heat resistance is reconciled with moldability (formidability) on high levels.

(6) Additives

In the present invention, stabilizers such as antioxidants (aging preventives), ultraviolet absorbents, light stabilizers and heat stabilizers; fillers such as organic fillers and inorganic fillers; coloring agents such as dyes and pigments; and other additives such as near-infrared absorbers, plasticizers, lubricants, antistatic agents, flame-retardants, other resins and soft polymers may be added to the transparent resin, if required. These additives may be used alone or in combination of two or more, and in such an amount as to be not detrimental to the objects of the present invention.

Of these additives, preference is given to antioxidants, ultraviolet absorbents, light stabilizers, filler and soft polymers. By using the soft polymer in an amount of preferably 0.001 to 0.5 part by weight, and more preferably 0.005 to 0.3 part by weight per 100 parts by weight of the alicyclic structure-containing polymer resin, clouding by moisture absorption can be prevented without detriment to transparency.

(7) Molding Processes

The light guide plate and light diffusion plate formed of the transparent resin may be fabricated by molding processes such as hot-melt molding processes as represented by injection molding, extrusion molding, blow molding, press molding and inflation molding; and solution processes as represented by solution casting, among which the injection molding and extrusion molding are well fit for the fabrication of light guide plates and light diffusion plates improved in terms of transparency.

(8) Illumination Unit

Used for the illumination of liquid crystal display systems, the illumination unit of the present invention essentially comprises an illumination light source and a light guide plate or a light diffusion plate. The light source is located such that emergent light rays are incident on the light guide plate or light diffusion plate.

The illumination unit is generally broken down into two types, i.e., (I) the back light type and (II) the front light type. The back light type illumination unit is located on the back surface of an LAD, while the front light type illumination unit is located on the front surface of the LAD. The back light type illumination unit is subdivided into the sidelight type and the underlying type.

(I) Back light Type Illumination Unit

The sidelight (or edge) type illumination unit comprises an illumination light source and a light guide plate. The illumination light, generally in a linear form, should preferably be positioned near at least one side surface (entrance surface) of the light guide plate. The distance between the illumination light source and the entrance surface of the light guide plate should be usually 0.01 to 5 mm, preferably 0.05 to 2 mm, and more preferably 0.1 to 1 mm. As the light source is far too away from the entrance surface, the intensity of ultraviolet rays incident on the entrance surface is subdued; however, the emission luminance of the illumination unit drops due to losses of light rays incident on the light guide plate. Conversely, as the light source comes far too close to the entrance surface of the light guide plate, the entrance surface is often deformed or colored due to the heat of the light source.

The linear light source may also be configured in an L- or C-shape; the former having two entrance surfaces and the latter three entrance surfaces. To enter the light rays from the light source into the light guide plate with the highest possible efficiency, it is preferable to locate a light-reflecting layer (reflector) around the light source. For the linear light source it is preferable to use a cold cathode fluorescent discharge tube in view of luminance, life, color displays, etc.

Figure 1:
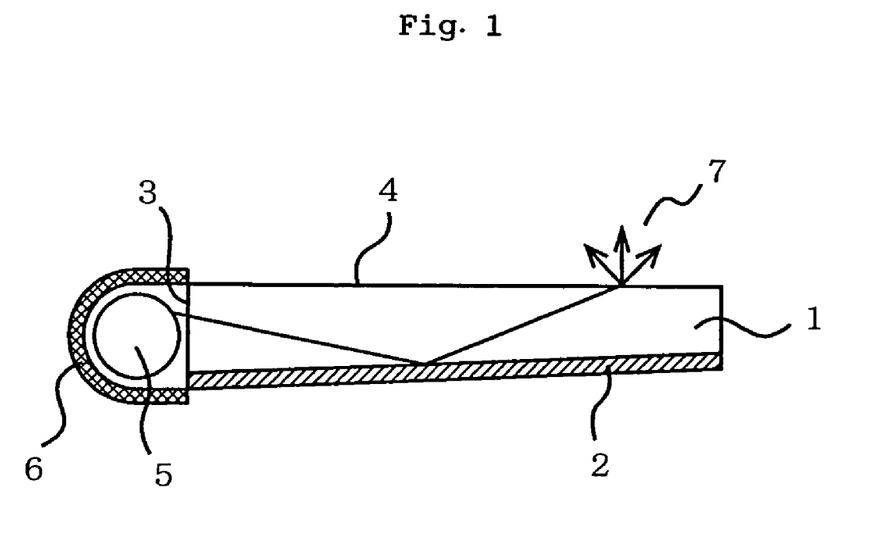
FIG. 1 is a schematic illustrative in section of one embodiment of the sidelight type illumination unit.

FIG. 1 is illustrative in section of one embodiment of the sidelight type illumination unit. The sidelight type illumination unit comprises a light guide plate 1 formed of the transparent resin and an illumination light source 5. The light guide plate 1 is provided on its back surface with a reflective sheet 2. One side surface 3 of the light guide plate 1 defines an entrance surface and the front surface of the light guide plate 1 defines an exit surface 4. Located in proximity to the entrance surface 3 is the illumination light source 5, around which a reflector 6 is provided. Instead of the reflective sheet, for instance, it is acceptable to use an aluminum-evaporated film or configure the back surface in a Fresnel mirror shape. While the light guide plate may be in a flat plate form, it should preferably be configured in such a wedge form as to become thin farther off the entrance surface 3 for the purpose of achieving improvements in light reflectivity and weight reductions. The exit surface 4 of the light guide plate may be provided with a diffusing sheet, or a diffusing layer by means of coating or the like. The light rays from the illumination light source 5 are entered from the entrance surface 3 into the light guide plate 1, and then reflected at the surface of the reflective sheet 2, leaving the exit surface 4 as shown by 7.

The underlying type illumination unit comprises an illumination light source, and a light diffusion plate two surfaces of which define an entrance surface and an exit surface. The distance between the illumination light source and the entrance surface of the light diffusion plate should be usually 0.5 to 50 mm, preferably 1 to 30 mm, and more preferably 3 to 20 mm. As the light source is far too away from the entrance surface, the intensity of ultraviolet rays incident on the entrance surface is subdued; however, the emission luminance of the illumination unit drops due to losses of light rays incident on the light guide plate. Conversely, as the light source comes far too close to the entrance surface of the light diffusion plate, the entrance surface is often deformed or colored due to the heat of the light diffusion plate.

For the light source, any of planar light sources such as electroluminescent (EL) light sources, point light sources such as LEDs and linear light sources such as fluorescent discharge tubes may be used; however, a cold cathode fluorescent discharge tube is preferred in consideration of luminance, life, color displays, etc. To enter the light from the light source into the light diffusion plate with the highest possible efficiency, it is preferable to provide a light-reflecting layer (reflector) behind the light source.

Figure 2:
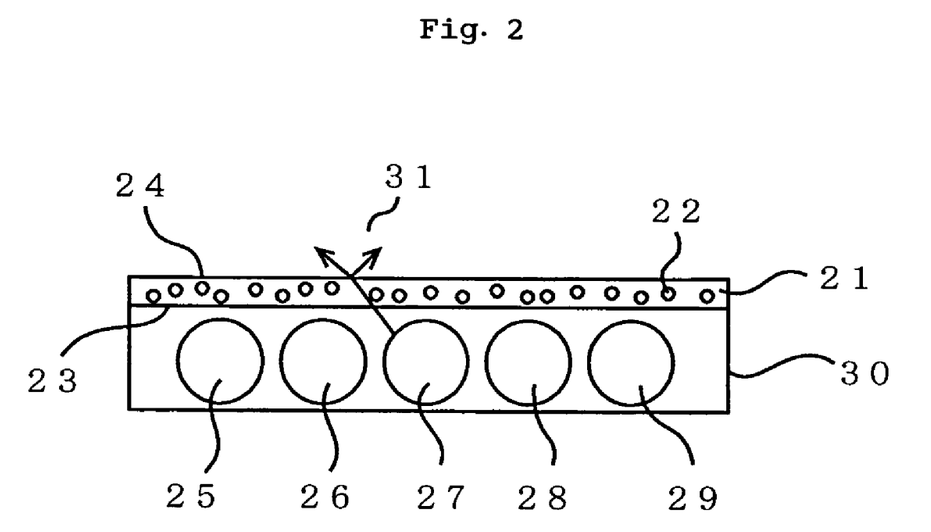
FIG. 2 is a schematic illustrative in section of one embodiment of the underlying type illumination unit.

FIG. 2 is illustrative in section of one embodiment of the underlying type illumination unit. A light diffusion plate 21 fabricated of the transparent resin contains a light-reflecting substance 22. Instead of the light-reflecting substance, it is acceptable to use air bubbles. On the back surface side of the light diffusion plate 21 there are one or more linear light sources 25, 26, 27, 28 and 29. Instead of those linear light sources, it is acceptable to use planar or point light sources. Light rays from the illumination light sources are entered from the entrance surface 23 of the light diffusion plate 21 into the light diffusion plate, wherein the light rays are diffused. Then, the diffused light leaves the exit surface 24 of the light diffusion plate as shown by 31. In general, the illumination light sources are enclosed by a housing 30; however, it is acceptable to provide a light-reflecting layer such as a reflective sheet (reflector) beneath the illumination sources.

(II) Front Light Type Illumination Unit

The front light type illumination unit is in principal the same in construction as the sidelight type illumination unit. In the front light type illumination unit, however, light rays leaving the light guide plate are reflected at the surface of an LAD, and the reflected light goes back through the light guide plate, leaving the front surface of the display. For this reason, a reflection type LAD is used as the LAD.

By way of example but not by way of limitation, it is acceptable to provide a fine bump-and-dip pattern on at least one surface of the light guide plate, and interpose a transparent plate between the light guide plate and the reflection type LAD.

An illumination light source, generally in a linear form, should preferably be positioned in the vicinity of at least one end face of the light guide plate. The distance between the light source and the entrance surface of the light guide plate should be usually 0.01 to 5 mm, preferably 0.05 to 2 mm, and more preferably 0.1 to 1 mm. As the light source is far too away from the entrance surface, the intensity of ultraviolet rays incident on the entrance surface is subdued; however, the emission luminance of the illumination unit drops due to losses of light rays incident on the light guide plate. Conversely, as the light source comes far too close to the entrance surface of the light guide plate, the entrance surface is often deformed or colored due to the heat of the light guide plate. The light source is not necessarily in a linear form; that is, it may be configured in an L-or C-shape. To enter the light from the light source into the light guide plate with the highest possible efficiency, it is preferable to provide a light-reflecting layer behind the light source.

EXAMPLES

More specifically but not exclusively, the present invention is now explained with reference to preparation examples, examples and comparative examples.

In these examples, the "part" is given by weight unless otherwise stated. Physical properties are measured as follows.

(1) Glass Transition Temperature (Tg)

The Tg was measured with a differential scanning calorimeter (DSC method).

(2) Molecular Weight

Unless otherwise stated, the molecular weight of the transparent resin was determined in terms of a weight-average molecular weight on a polyisoprene basis, as measured by gel permeation chromatography (GPC) using cyclohexane as the solvent.

(3) Intensity of Light

The intensity of light was measured by an actinometer (FASTEVERT S-2400 made by Soma Optics Co., Ltd.) corrected with a standard light source (a spectral irradiance standard halogen lamp made by Ushio Electric Inc.).

The maximum intensity of light on the entrance surface of the light guide plate or light diffusion plate was determined in terms of the intensity of ultraviolet rays having a wavelength of 350 nm or less at the maximum emission intensity wavelength. The maximum emission intensity of the illumination light source in the ultraviolet range having a wavelength of 350 nm or less was determined by the direct measurement of light while the fiber of the actinometer was located at a position spaced barely about 0.5 mm away from the surface of the light source (specifically, the surface of the cold cathode fluorescent discharge tube).

(4) Maximum Light Transmittance

The maximum light transmittance at wavelengths of 200 to 350 nm of the tube material forming the cold cathode fluorescent discharge tube was determined by measuring the transmittance at 313 nm of a 1-mm thick sample using an ultraviolet spectrometer.

(5) Evaluation of the Illumination Unit After Used Over an Extended Period of Time The evaluation of the illumination unit after used over an extended period of time was made as follows.

The illumination unit was continuously held on for 1,000 hours. Then, the luminance and chromaticity of the illumination unit were measured at a total of nine areas obtained by trisecting the long and short sides of the light-emitting surface of the unit, using a luminance meter (BM-7 made by Topcon Co., Ltd.). For chromaticity, the average value of changes ($\Delta x$, $\Delta y$) in the chromaticity coordinates (x, y) was measured.

Preparation Example 1

In a reactor placed in a nitrogen atmosphere, 0.8 part of 1-hexene, 0.15 part of dibutyl ether and 0.30 part of triisobutylaluminum were mixed at room temperature with 500 parts of dehydrated cyclohexane. Then, while the mixture was kept at 45° C., 30 parts of 8-ethyl-tetracyclo[$4.4.0.1^{2,5}.1^{7,10}$]-dodeca-3-ene (hereinafter ETD for short), 170 parts of tricyclo[$4.3.0.1^{2,5}$]deca-3,7-diene (dicyclopentadiene; hereinafter DCP for short) and 40 parts of a 0.7% toluene solution of tungsten hexachloride were continuously added to the mixture over 2 hours for polymerization. Then, 1.06 parts of butyl glycidyl ether and 0.52 part of isopropyl alcohol were added to the polymerization solution to inactivate the polymerization catalyst, thereby stopping the polymerization reaction.

Added to 100 parts of a reaction solution containing the thus obtained ring-opening polymer was 270 parts of cyclohexane and then 5 parts of a nickel-alumina catalyst (made by Nikki Chemical Industries, Ltd.) acting as a hydrogenation catalyst. The reaction solution was pressurized by hydrogen to 50 kg/cm$^2$ and heated under agitation to a temperature of 200° C. for a further 4-hour reaction, thereby obtaining a reaction solution containing a hydrogenated ETD/DCP ring-opening polymer in an amount of 20%. The copolymerization rate of the respective norbornene monomers in the polymer was calculated from the composition of the norbornene monomers remaining in the post-polymerization solution (by means of gas chromatography). It was consequently found that ETD/DCP=15/85 nearly equal to the starting composition. This hydrogenated ETD/DCP ring-opening polymer had a weight-average molecular weight (Mw) of 31,000, a hydrogenation rate of 99.9% and a Tg of 100° C.

Preparation Example 2

In a stainless steel reactor that was fully dried and replaced by nitrogen and had an agitator, 320 parts of dehydrated cyclohexane, 60 parts of styrene monomer and 0.38 part of dibutyl ether were charged, and 0.36 part of a n-butyllithium solution (15% hexane solution) was added under agitation at 60° C. to the solution to initiate a polymerization reaction. After a 1-hour polymerization reaction, 20 parts of a monomer mixture consisting of 8 parts of styrene monomer and 12 parts of isoprene monomer was added to the reaction solution for a further 1-hour polymerization reaction. Then, 0.2 part of isopropyl alcohol was added to the reaction solution to stop the reaction.

The weight-average molecular weight (Mw) and molecular weight distribution (Mw/Mn) of the obtained block copolymer were found to be Mw=102,100 and Mw/Mn=1.11.

Then, 400 parts of the polymerization reaction solution were passed into a pressure-resistant reactor having an agitator, wherein 10 parts of a nickel catalyst carried on silica-alumina (E22U containing 60% of nickel, made by Nikki Chemical Industries, Ltd.) were mixed with the reaction solution. The reactor was replaced therein by hydrogen gas and hydrogen was supplied under agitation to the solution for an 8-hour hydrogenation reaction at a temperature of 160° C. and a pressure of 4.5 MPa.

After the completion of the hydrogenation reaction, the reaction solution was filtered for removal of the hydrogenation catalyst. Then, 800 parts of cyclohexane were added to the reaction solution for dilution, followed by the pouring of the diluted solution in 3,500 parts of isopropanol (that had passed through a filter having a pore diameter of 1 μm in a class 1,000 clean room), thereby precipitating a block copolymer. Finally, the block copolymer was separated and recovered by filtration, and dried under reduced pressure at 80° C. for 48 hours.

The thus obtained block copolymer was a block bipolymer containing a block (hereinafter St for short) including a styrene-derived repeating unit and a block (hereinafter St/Ip for short) including a repeating unit derived from styrene and isoprene, with the block molar ratio being St:St/Ip=69:31 (St:Ip=10:21). That block copolymer was found to be Mw=85,100, Mw/Mn=1.17 and Tg=126.5° C., with the hydrogenation rate of the main chain and aromatic ring being 99.9%.

Example 1

(1) Molding of Light Guide Plate

One hundred (100) parts of the hydrogenated ring-opening polymer obtained in Preparation Example 1, to which 0.5 part of an aging preventive (Tominox TT made by Yoshitomi Pharmaceutical Co., Ltd.) and 0.02 part of a soft polymer (Toughtex H1052 made by Asahi Chemical Industry Co., Ltd.) were added, were kneaded and extruded through a twin-screw kneader (TEM-35B made by Toshiba Machine Co., Ltd. with a screw diameter of 37 mm, L/D=32, 250 screw rpm., a resin temperature of 230° C. and a feed rate of 10 kg/hour) for pelletization.

The obtained pellet was preheated and pre-dried at 80° C. for 4 hours, and then passed through an injection molding machine (Product No. IS450 made by Toshiba Machine Co., Ltd.) to obtain a 14.1-inch light guide plate. The injection molding was carried out at a mold temperature of 70° C. and a cylinder temperature of 270° C.

The obtained light guide plate was configured in such a wedge form that the thickness of a thick portion on the entrance surface side was 2.4 mm and the thickness of a thin portion on the opposite side was 0.8 mm while the wedge becomes gradually thin from the thick portion toward the thin portion (in a substantially vertical direction to the axial center of a linear light source).

(2) Preparation of the Back light Illumination Unit

A reflective sheet was located on the light-reflecting surface of the light guide plate obtained as mentioned above, and a linear light source and a reflector were located on the side surface (entrance surface) of the thick portion of the light guide plate. For the linear light source, a cold cathode fluorescent discharge tube (A) of 2 mmφ in diameter was used. The tube was formed of borosilicate glass (BFW made by Nippon Electric Glass Co., Ltd.). The ultraviolet (313 nm) transmittance of a 1-mm thick BFW glass was 65%. The distance between the cold cathode fluorescent discharge tube (A) and the entrance surface of the light guide plate was about 0.5 mm. The intensity of ultraviolet rays having a wavelength of 350 nm or less on the entrance surface of the light guide plate, as measured at the maximum emission intensity wavelength, was 1.55 μW/(cm$^2$·nm). After the unit was held on for 1,000 hours, the amount of chromaticity changes and the luminance were measured. It was consequently found that Δx=0.0089, Δy=0.0158, and the average luminance was 1,802 cd/cm$^2$. The results are tabulated in Table 1.

Example 2

A back light unit was prepared and evaluated as in Example 1 with the exception that the linear light source used was a cold cathode fluorescent discharge tube (B) of 2 mmφ in diameter (formed of borosilicate glass; BFK made by Nippon Electric Glass Co., Ltd. with an ultraviolet (313 nm) transmittance of 86% at a thickness of 1 mm), which was coated on its surface with titanium dioxide. The results are tabulated in Table 1.

Example 3

A back light unit was prepared and evaluated as in Example 1 with the exception that the cold cathode fluorescent discharge tube (A) used therein was coated on its surface with silicon oxide (SiO). The results are tabulated in Table 1.

Example 4

A back light unit was prepared and evaluated as in Example 1 with the exception that the cold cathode fluorescent discharge tube (A) used therein was coated on its surface with titanium dioxide (TiO$_2$). The results are tabulated in Table 1.

Example 5

A back light unit was prepared and evaluated as in Example 1 with the exception that an array of light-emitting diodes (LEDs)(29, each having a diameter of 1 mmφ) was used in place of the cold cathode fluorescent discharge tube. The results are tabulated in Table 1.

Example 6

A light guide plate and a back light unit were prepared and evaluated as in Example 4 with the exception that the hydrogenated block copolymer obtained in Preparation Example 2 was used in lieu of the hydrogenated ring-opening polymer obtained in Preparation Example 1. The results are tabulated in Table 1.

Example 7

(1) Molding of the Light Diffusion Plate

One hundred (100) parts of the hydrogenated block copolymer obtained in Preparation Example 2, to which 0.5 part of an aging preventive (Tominox TT made by Yoshitomi Pharmaceutical Co., Ltd.), 0.02 part of a soft polymer (Toughtex H1052 made by Asahi Chemical Chemical Industry Co., Ltd.) and 2.9 parts of crosslinkable silicone beads (Tospearl 145 made by Toshiba Silicone Co. Ltd.) were added, were kneaded and extruded through a twin-screw kneader (TEM-35B made by Toshiba Machine Co., Ltd.

with a screw diameter of 37 mm, L/D=32, 250 screw rpm., a resin temperature of 210° C. and a feed rate of 10 kg/hour) for pelletization.

The obtained pellet containing crosslinkable silicone beads was preheated and pre-dried at 85° C. for 4 hours, and then passed through an injection molding machine (Product No. IS450 made by Toshiba Machine Co., Ltd.) to obtain a 10.4-inch, 2-mm thick light diffusion plate. The injection molding was carried out at a mold temperature of 105° C. and a cylinder temperature of 270° C.

(2) Preparation of the Back light Illumination Unit

Five (5) cold cathode fluorescent discharge tubes coated with titanium dioxide, as used in Example 4, were juxtaposed at equal intervals on the entrance surface of the light diffusion plate obtained as mentioned above. The intensity of ultraviolet rays having a wavelength of 350 nm or less on the entrance surface of the light diffusion plate, as measured at the maximum emission intensity wavelength, was 0.17 $\mu W/(cm^2 \cdot nm)$. Subsequently, chromaticity changes were measured and evaluated as in Example 1. The results are tabulated in Table 1.

Comparative Example 1

A back light unit was prepared and evaluated as in Example 1 with the exception that the linear light source used was a cold cathode fluorescent discharge tube (C) of 2 mmφ in diameter (formed of borosilicate glass; BF-38 made by Nippon Electric Glass Co., Ltd. with an ultraviolet (313 nm) transmittance of 90% at a thickness of 1 mm). The results are tabulated in Table 1.

Comparative Example 2

A back light unit was prepared and evaluated as in Example 2 with the exception that the cold cathode fluorescent discharge tube (B) was not coated with titanium dioxide. The results are tabulated in Table 1.

The invention claimed is:

1. An illumination unit for liquid crystal display systems, which comprises (A) an illumination light source for emitting visible light rays and (B) a light guide plate or a light diffusion plate having an entrance surface and an exit surface, said illumination light source being located such that light rays therefrom are entered into said light guide plate or light diffusion plate from said entrance surface, wherein:

the illumination light source is a cold cathode fluorescent discharge tube, said light guide plate or said light diffusion plate is formed of a transparent synthetic resin, and a maximum intensity of light in an ultraviolet range having a wavelength of 350 nm or less as measured all over said entrance surface of said light guide plate or said light diffusion plate is 2 $\mu W/(cm^2 \cdot nm)$ or less.

2. The illumination unit for liquid crystal display systems according to claim 1, wherein the illumination light source has a maximum emission intensity of 2 $\mu W/(cm^2 \cdot nm)$ or less in an ultraviolet range having a wavelength of 350 nm or less.

3. The illumination unit for liquid crystal display systems according to claim 1, wherein the illumination light source is a cold cathode fluorescent discharge tube comprising a tube formed of a material having a maximum light transmittance of 85% or less in an ultraviolet range having a wavelength of 200 to 350 nm, as measured at a thickness of 1 mm.

4. The illumination unit for liquid crystal display systems according to claim 3, wherein the material that forms the tube of the cold cathode fluorescent discharge tube is a borosilicate glass containing an ultraviolet-absorbing metal oxide.

5. The illumination unit for liquid crystal display systems according to claim 4, wherein the ultraviolet-absorbing

TABLE 1

| | Type of light source | Tube material | Transmittance of tube material % ($T_{313\ nm}$) | Metal oxide layer | Intensity of ultraviolet rays(*1) Maximum emission intensity(*2) $\mu W/cm^2/nm$ | Chromaticity changes after the backlight held on for 1,000 hours | | Average luminance cd/cm² |
|---|---|---|---|---|---|---|---|---|
| | | | | | | Δx | Δy | |
| Ex. 1 | CFL | BFW | 65 | — | 1.55 | 0.0089 | 0.0158 | 1802 |
| Ex. 2 | CFL | BFK | 86 | TiO₂ | 0.87 | 0.0053 | 0.0112 | 1865 |
| Ex. 3 | CFL | BFW | 65 | SiO | 0.25 | 0.0026 | 0.0068 | 1930 |
| Ex. 4 | CFL | BFW | 65 | TiO₂ | 0.16 | 0.0010 | 0.0063 | 1885 |
| Ex. 5 | LED | — | — | — | 0 | 0.0000 | 0.0000 | 1810 |
| Ex. 6 | CFL | BFW | 65 | TiO₂ | 0.16 | 0.0005 | 0.0035 | 1935 |
| Ex. 7 | CFL | BFW | 65 | TiO₂ | 0.17 | 0.0005 | 0.0036 | 1950 |
| Comp. Ex. 1 | CFL | BX-38 | 90 | — | 3.78 | 0.0208 | 0.0312 | 1765 |
| Comp. Ex. 2 | CFL | BFK | 86 | — | 2.05 | 0.0188 | 0.0276 | 1768 |

CFL: Cold cathode fluorescent discharge tube
(*1)Intensity of ultraviolet rays on the entrance surface
(*2)Maximum emission intensity of 350 nm or less

INDUSTRIAL APPLICABILITY

Thus, the present invention provides an illumination unit for liquid crystal display systems, which has high luminance and improved heat resistance, and is not susceptible to coloration even upon used over an extended period of time.

metal oxide is at least one selected from the group consisting of titanium oxide, cerium oxide, zinc oxide, tantalum oxide, zirconium oxide and silicon oxide.

6. The illumination unit for liquid crystal display systems according to claim 3, wherein the material that forms the tube of the cold cathode fluorescent discharge tube comprises a glass tube and an ultraviolet-absorbing metal oxide layer provided on at least one surface of a front surface and a back surface thereof.

7. The illumination unit for liquid crystal display systems according to claim 6, wherein the ultraviolet-absorbing metal oxide layer is a layer formed of at least one metal oxide selected from the group consisting of titanium oxide, cerium oxide, zinc oxide, tantalum oxide, zirconium oxide and silicon oxide.

8. The illumination unit for liquid crystal display systems according to claim 1, wherein the light guide plate or light diffusion plate has an ultraviolet-absorbing metal oxide layer formed on the entrance surface thereof.

9. The illumination unit for liquid crystal display systems according to claim 1, wherein the transparent synthetic resin is an alicyclic structure-containing polymer resin.

10. The illumination unit for liquid crystal display systems according to claim 1, wherein the transparent synthetic resin contains at least one additive selected from the group consisting of an antioxidant, an ultraviolet absorbent, a light stabilizer, a filler and a soft polymer.

11. An illumination unit for liquid crystal display systems, which comprises (A) an illumination light source for emitting visible light rays and (B) a light guide plate or a light diffusion plate having an entrance surface and an exit surface, said illumination light source being located such that light rays therefrom are entered into said light guide plate or light diffusion plate from said entrance surface, wherein:
the light source has a maximum emission intensity of 2 $\mu W/(cm^2 \cdot nm)$ or less in an ultraviolet range having a wavelength of 350 nm or less, and
the light guide plate or said light diffusion plate is formed of an alicyclic structure-containing polymer resin.

12. The illumination unit for liquid crystal display systems according to claim 11, wherein the illumination light source is a cold cathode fluorescent discharge tube comprising a tube formed of a material having a maximum light transmittance of 85% or less in an ultraviolet range having a wavelength of 200 to 350 nm, as measured at a thickness of 1 mm.

13. The illumination unit for liquid crystal display systems according to claim 12, wherein the material that forms the tube of the cold cathode fluorescent discharge tube is a borosilicate glass containing an ultraviolet-absorbing metal oxide.

14. The illumination unit for liquid crystal display systems according to claim 13, wherein the ultraviolet-absorbing metal oxide is at least one selected from the group consisting of titanium oxide, cerium oxide, zinc oxide, tantalum oxide, zirconium oxide and silicon oxide.

15. The illumination unit for liquid crystal display systems according to claim 12, wherein the material that forms the tube of the cold cathode fluorescent discharge tube comprises a glass tube and an ultraviolet-absorbing metal oxide layer provided on at least one surface of a front surface and a back surface thereof.

16. The illumination unit for liquid crystal display systems according to claim 15, wherein the ultraviolet-absorbing metal oxide layer is a layer formed of at least one metal oxide selected from the group consisting of titanium oxide, cerium oxide, zinc oxide, tantalum oxide, zirconium oxide and silicon oxide.

17. The illumination unit for liquid crystal display systems according to claim 11, wherein the light guide plate or light diffusion plate has an ultraviolet-absorbing metal oxide layer formed on the entrance surface thereof.

18. The illumination unit for liquid crystal display systems according to claim 11, wherein the transparent synthetic resin is an alicyclic structure-containing polymer resin.

19. The illumination unit for liquid crystal display systems according to claim 11, wherein the transparent synthetic resin contains at least one additive selected from the group consisting of an antioxidant, an ultraviolet absorbent, a light stabilizer, a filler and a soft polymer.

20. The illumination unit for liquid crystal display systems according to claim 11, which is a backlight or a front light for a liquid crystal display system.

\* \* \* \* \*